UNITED STATES PATENT OFFICE 2,575,351

24-ARYL-5,23-CHOLADIENES

Robert H. Levin, A. Vern McIntosh, Jr., and George B. Spero, Kalamazoo, Mich., assignors to The Upjohn Company, Kalamazoo, Mich., a corporation of Michigan No Drawing. Application December 4, 1948, Serial No. 63,616

5 Claims. (Cl. 260—397.5)

This invention relates to a new class of substances, designated 24-aryl-5,23-choladienes, having the basic structure represented by the general formula:

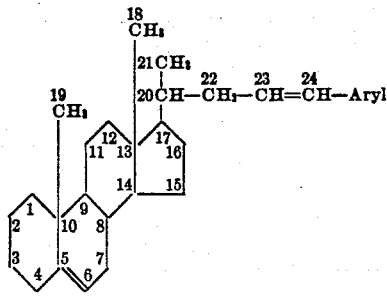

It is an object of the present invention to provide 24-aryl-5,23-choladienes. It is a further object of this invention to provide 24-aryl-5,23-choladienes having nuclear substituents. It is an additional object of this invention to provide 24-aryl-5,23-choladienes having nuclear substituents which are joined to the choladiene ring system through an oxygen atom. It is also an object of this invention to provide 24-aryl-5,23-choladienes substituted in the choladiene nucleus by hydroxyl, alkoxy and acyloxy groups. Other objects and advantages of the invention, some of which are referred to hereinafter, will be apparent to those skilled in the art to which the invention pertains.

Members of this new class of 5,23-choladienes are of value in the preparation of other steroid compounds. For example, the side chain double bond may be oxidized with chromic oxide to a nor-cholenic acid according to conventional methods for chromic acid oxidation. The compounds of this invention, wherein the 3-substituent in the nucleus is a hydroxyl, may be oxidized with aluminum isopropoxide to give a 3-keto-24-aryl-4,23-choladiene or with chromic oxide to give a 3-keto-24-aryl-4,23-choladiene or a 3-keto-24-aryl nor-4-cholenic acid, according to methods known to the art. Other compounds may likewise be prepared from the compounds of this invention as may be apparent to those skilled in this art.

While the aryl group will be described with particular reference to phenyl and p-methoxyphenyl, it is to be understood that other aryl groups, such as alkoxyphenyl, alpha-naphthyl, beta-naphthyl, p-tolyl, and methoxynaphthyl, are within the scope of this invention.

The dehydration of side-chain tertiary steroid alcohols in which two aromatic groups are attached to the same carbon as the hydroxyl group is known to take place readily. However the dehydration of side-chain secondary steroid alcohols in which but one aromatic group is attached to the carbon atom does not take place readily when many of the commonly used dehydrating agents are used, such as thionyl chloride in pyridine (Darzen's method), phosphorus oxychloride, concentrated sulfuric acid, activated alumina and para-toluenesulfonic acid. The dehydration of side-chain secondary alcohols can be accomplished by heating the alcohol in toluene under reflux with para-toluenesulfonic acid in the presence of phenol, or preferably by heating the alcohol to from 150-300 degrees centigrade in the presence of anhydrous oxalic acid and an inert solvent. This dehydration of steroid alcohols in which but one aromatic ring is attached to the carbon carrying the hydroxyl group is more fully described and claimed in the copending application of George B. Spero, Robert H. Levin, and Frederick W. Heyl, Serial 63,615.

The 24-aryl-24-hydroxy-5-cholenes from which the compounds of this invention are prepared can be obtained by reacting an arylmagnesium halide with a 5-cholene-24-aldehyde, decomposing the resulting addition complex and isolating the resulting 24-aryl-24-hydroxy-5-cholene compound, in accordance with the method of Robert H. Levin, A. Vern McIntosh, Jr., and Douglas E. Rayman, J. Am. Chem. Soc. 70, 2958 (1948).

Compounds contemplated by this invention and which can be prepared by the methods disclosed herein include, among others, 24-phenyl-5,23 - choladiene; 24 - p - methoxyphenyl - 5,23 - choladiene; 3-hydroxy-24-alpha-naphthyl-5,23-choladiene; 3 - methoxy-24-beta-naphthyl-5,23-choladiene; 3,12 - dihydroxy - 24 - phenyl-5,23-choladiene; 3,12-diacetoxy-24-phenyl-5,23-choladiene; 3-propoxy-24-phenyl-5,23-choladiene; 3-isobutyroxy - 24 - phenyl-5,23-choladiene; 3-benzyloxy-24-p-methoxy-phenyl-5,23-choladiene; 3-benzoyloxy-24-p-tolyl-5,23-choladiene; 3-phenyl-acetoxy-24-beta-naphthyl-5,23-choladiene; 3-cyclohexyloxy-24-phenyl-5,23-choladiene; 24-p-tolyl-5,23-choladiene and others.

The following examples are illustrative of the preparation of compounds of this invention but the invention is not to be considered as limited thereto.

*Preparation 1.—24-phenyl - (delta - 5) - cholene-3,24-diols*

To a Grignard solution prepared from 0.6 gram of magnesium and 5.5 grams of bromobenzene in 250 milliliters of anhydrous ether was added over a period of one hour 2.0 grams of 3(beta)-acetoxy-(delta-5)-cholene-24-al [A. Vern McIntosh, Jr., Elizabeth M. Meinzer, and Robert H. Levin, J. Am. Chem. Soc. 70, 2956 (1948)], dissolved in 75 milliliters of benzene. The reaction mixture was heated under reflux during the mixing of the reagents and for one hour thereafter. The mixture was then cooled and 3 N hydrochloric acid added to decompose the resulting Grignard complex. An insoluble precipitate of the stereoisomeric 24-phenyl-(delta-5)-cholene-3(beta)-24 diols was obtained. This precipitate, upon crystallization from benzene, gave an isomer (A) melting at 214-217 degrees centigrade; $[\alpha]_D^{25}$—7.0 degrees.

The ether-benzene phase mother liquors from the above were separated and steam-distilled. The resulting water-insoluble, nonvolatile residue, which melted at 186-190 degrees centigrade, upon crystallization from benzene gave an isomer (B) melting at 184-186 degrees centigrade; $[\alpha]_D^{25}$—38.2 degrees.

*Preparation 2.—3 - hydroxy - 24 - keto-24-anisyl-(delta-5)-cholene*

To a Grignard solution prepared from 2.4 grams of magnesium, 13 milliliters of p-bromoanisole, and fifty milliliters of anhydrous ether, cooled in an ice bath, was added 9.17 grams of anhydrous cadmium chloride. The mixture was heated under reflux for one hour and then cooled to zero degrees centigrade. A solution of 8.0 grams of 3(beta)-formyloxy-(delta-5) cholenic acid chloride [Willard M. Hoehn and Robert Bruce Moffett, J. Am. Chem. Soc. 67, 740 (1945)] in fifty milliliters of benzene was added over a period of twenty minutes. The reaction mixture was heated under reflux for one hour, cooled and poured into a mixture of ice and hydrochloric acid. The ether-benzene layer was separated, washed successively with dilute sodium hydroxide solution and water, dried and evaporated to dryness. The resulting residue was saponified by refluxing for one hour with 100 milliliters of five percent methanolic potassium hydroxide solution. After reflux, the solution was diluted with water and extracted with ether. The ether was washed, dried, and evaporated to dryness. The resulting residue, consisting essentially of 3-(beta)-hydroxy - 24 - keto-24-p-anisyl-(dela-5)-cholene, was crystallized from acetone; melting point 154-157 degrees centigrade; oxime, melting point 177-179 degrees centigrade.

*Preparation 3.—24-p-anisyl-(delta - 5)-cholene-3,24-diols*

To a solution of 2.45 grams of lithium aluminum hydride in 200 milliliters of anhydrous ether, a solution of 4.35 grams of 3(beta)-hydroxy-24-keto - 24 - p - anisyl-(delta-5)-cholene (Preparation 2) in 1300 milliliters of anhydrous ether was added over a period of twenty minutes. The reaction mixture was maintained under an atmosphere of nitrogen and was agitated during the addition; thereafter the mixture was allowed to stand at room temperature for 40 minutes while maintained in the atmosphere of nitrogen. Excess lithium aluminum hydride was slowly decomposed by addition of water and 200 milliliters of iced five percent hydrochloric acid was added. Some of the product precipitated at this point and was filtered from solution. The aqueous phase was then extracted with chloroform and ether and the chloroform fractions were washed with water, combined, dried, and concentrated. On cooling, a mixture of isomers of 24 - p-anisyl - (delta - 5)-cholene-3(beta),24-diols crystallized. The yield was 3.1 grams; melting point 160-185 degrees centigrade.

*Example 1.—3(beta)-hydroxy- 24 -phenyl-5,23-choladiene*

A mixture of eight grams of the two epimers of 24-phenyl-5-cholene-3(beta),24-diol (Preparation 1), 16 grams of anhydrous oxalic acid and 160 milliliters of a mixture of diphenyl oxide and diphenyl (Dowtherm A) were heated under reflux for ninety minutes. The bulk of the solvent was removed under reduced pressure. During the removal of the solvent the excess oxalic acid sublimed from the reaction mixture. The residue was cooled and dissolved in 200 milliliters of ether. The ethereal solution was washed with two percent sodium bicarbonate solution and water, dried and the ether removed. The residue was dissolved in 200 milliliters of purified commercial hexane and passed over 230 grams of alumina (Fisher Adsorption Alumina) in a column five centimeters in diameter. Elution of the column with 700 milliliters of a mixture of equal parts of hexane and benzene removed the remainder of the Dowtherm A. Elution of the column with 800 milliliters of a mixture of benzene (92 parts) and methanol (8 parts), evaporation of the solvent and crystallization from ether yielded 5.28 grams of 3(beta)-hydroxy-24-phenyl-5,23-choladiene, melting at 108-118 degrees centigrade. The product could not be crystallized to a narrower melting range because of its tendency to solvate.

*Example 2.—3-acetoxy-24-phenyl-5,23-choladiene*

The 3(beta) - hydroxy - 24 - phenyl - 5,23-choladiene (Example 1) was mixed with acetic anhydride and pyridine and heated at 90-100 degrees centigrade for three hours. The reaction mixture was poured into water, the aqueous mixture extracted with ether, dried and the ether removed. The resulting 3-acetoxy-24-phenyl-5,23-choladiene after crystallization from methanol melted at 176.5-177.5 degrees centigrade and showed a levo rotation of $[\alpha]_D^{25}$—31.4 degrees. Its percentage analysis was as follows:

| | C | H | Acetyl |
|---|---|---|---|
| Calculated for $C_{32}H_{44}O_2$ | 83.43 | 9.63 | 9.3 |
| Found | 83.10 | 9.60 | 10.2 |

The tetrabromide formed by the addition of bromine to the acetate in chloroform, after crystallization from a mixture of methanol and ether, melted at 176-179 degrees centigrade.

*Example 3.—3-hydroxy-24-p-anisyl-5,23-choladiene*

A mixture of one gram of the epimers of 3(beta),24 - dihydroxy - 24 - p - anisyl-(delta-5)-cholene (Preparation 3), 40 milliliters of a mixture of diphenyl and diphenyl oxide (Dowtherm A) and 4.0 grams of anhydrous oxalic acid was heated under reflux for two hours. The reaction mixture was cooled, diluted with sixty milliliters of benzene, washed with water and dried. The solution was passed through a column of chromatographic grade alumina. The column was eluted first with 100 milliliters of benzene and then with 100 milliliters of a mixture of benzene (92 parts) and methanol (8 parts). The benzene eluate containing the Dowtherm A was discarded. The second eluate was evaporated to dryness, and the solid residue, after several crystallizations from methanol, gave 0.6 gram of 3-hydroxy-24-p-anisyl-5,23 choladiene melting at 158-161 degrees centigrade. The ultraviolet absorption spectra showed a peak at 262 millimu, E=28 300.

Inasmuch as the foregoing description comprises preferred embodiments of the invention it is to be understood that modifications and variations may be made therein in conventional manner and that the invention is not to be limited except as defined in the appended claims.

We claim:

1. A 24-monoaryl-5,23-choladiene, wherein the aryl group is selected from the class consisting of phenyl and para-anisyl.

2. A 24-monoaryl-5,23-choladiene having the following general formula:

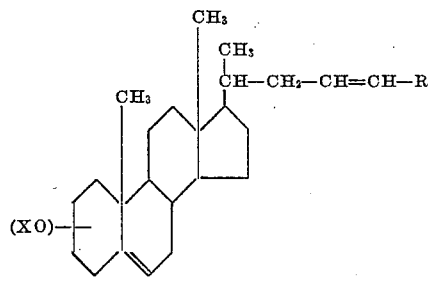

in which R is a member of the group consisting of phenyl and para-anisyl radicals, X is a member of the group consisting of hydrogen and acetyl radicals, the group (XO) being in the 3 position of the steroid nucleus.

3. 24 - mono - phenyl - 3 - hydroxy - 5,23-choladiene.

4. 24 - mono - phenyl - 3 - acetoxy - 5,23-choladiene.

5. 24 - mono - para - anisyl - 3 - hydroxy-5,23-choladiene.

ROBERT H. LEVIN.
A. VERN McINTOSH, Jr.
GEORGE B. SPERO.

REFERENCES CITED

The following references are of record in the file of this patent:

UNITED STATES PATENTS

| Number | Name | Date |
|---|---|---|
| 2,461,910 | Miescher | Feb. 15, 1949 |